United States Patent
Koo et al.

(10) Patent No.: US 8,665,770 B2
(45) Date of Patent: Mar. 4, 2014

(54) MBMS FEEDBACK METHOD FOR E-MBS ADAPTATION

(75) Inventors: Ja Ho Koo, Gyeonggi-do (KR); Su Nam Kim, Gyeonggi-do (KR); Bin Chul Ihm, Gyeonggi-do (KR); Jin Young Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 13/060,966

(22) PCT Filed: Aug. 25, 2009

(86) PCT No.: PCT/KR2009/004729
§ 371 (c)(1),
(2), (4) Date: Mar. 22, 2011

(87) PCT Pub. No.: WO2010/024571
PCT Pub. Date: Mar. 4, 2010

(65) Prior Publication Data
US 2011/0164545 A1 Jul. 7, 2011

Related U.S. Application Data

(60) Provisional application No. 61/091,738, filed on Aug. 26, 2008.

(30) Foreign Application Priority Data

Feb. 6, 2009 (KR) .................. 10-2009-0009783

(51) Int. Cl.
*H04W 4/06* (2009.01)

(52) U.S. Cl.
USPC ............................................. 370/312

(58) Field of Classification Search
USPC .................. 370/310–350, 370–350
See application file for complete search history.

(56) References Cited

U.S. PATENT DOCUMENTS

| | | | |
|---|---|---|---|
| 7,206,352 B2 * | 4/2007 | Birru et al. | 375/265 |
| 2004/0151133 A1 | 8/2004 | Yi et al. | |
| 2004/0224698 A1 | 11/2004 | Yi et al. | |
| 2008/0045228 A1 * | 2/2008 | Zhang et al. | 455/450 |
| 2008/0084844 A1 * | 4/2008 | Reznik et al. | 370/330 |
| 2008/0225792 A1 * | 9/2008 | Naguib et al. | 370/330 |
| 2008/0267158 A1 * | 10/2008 | Zhang et al. | 370/342 |
| 2009/0046637 A1 | 2/2009 | Kim et al. | |
| 2009/0276674 A1 * | 11/2009 | Wei et al. | 714/749 |
| 2010/0322102 A1 * | 12/2010 | Zhou et al. | 370/252 |
| 2010/0325508 A1 * | 12/2010 | Hu et al. | 714/749 |

FOREIGN PATENT DOCUMENTS

WO WO2006-070992 7/2006

* cited by examiner

*Primary Examiner* — Ricky Ngo
*Assistant Examiner* — Wei-Po Kao
(74) *Attorney, Agent, or Firm* — Morgan, Lewis & Bockius LLP (57) ABSTRACT

An MBS feedback method is disclosed. The MBS feedback method includes detecting one or more codes multiplexed in Code Division Multiplexing (CDM) from an MBS feedback channel, and adjusting a Modulation and Coding Scheme (MCS) based on the detected one or more codes.

18 Claims, 8 Drawing Sheets

MBMS FEEDBACK METHOD FOR E-MBS ADAPTATION

The present application is a national stage of PCT International Application No. PCT/KR2009/004729, filed Aug. 25, 2009, and claims the benefit of U.S. Provisional Application No. 61/091,738, filed Aug. 26, 2008. The present national stage application also claims the benefit of Korean Patent Application No. 10-2009-0009783, filed Feb. 6, 2009.

TECHNICAL FIELD

The present invention relates to a broadband wireless mobile communication system, and more particularly, to a Multicast and Broadcast Service (MBS) system.

BACKGROUND ART

A MBS is a point-to-multipoint service by which data is transmitted from one source to a plurality of receivers. For efficient use of radio resources, the same data is transmitted to a plurality of receivers via a common radio channel.

Typically, there are two types of MBS in a general wireless access system, single-Base Station (BS) access and multi-BS access. In the single-BS access, one BS services in one cell, whereas in the multi-BS access, a plurality of BSs forms one MBS zone and provides an MBS service in the MBS zone. Since a plurality of cells within the MBS zone receives the same bursts from an MBS server using an MBS zone Identifier (ID) and provides the MBS service, service continuity and macro-diversity gain can be achieved without handover in case of movement between cells including BSs.

Figure 1:
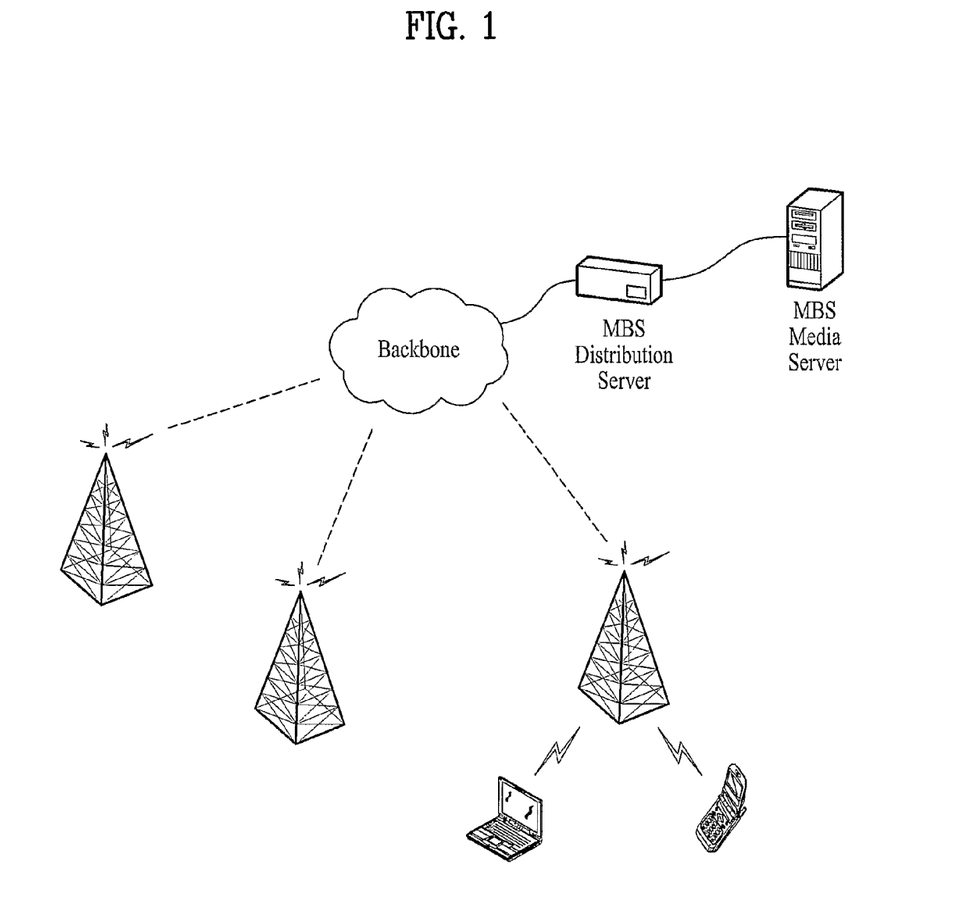
FIG. 1 illustrates an exemplary MBS reference model for a broadband wireless access system.

FIG. 1 illustrates an exemplary MBS reference model for a broadband wireless access system.

Referring to FIG. 1, an MBS network includes an MBS media server, an MBS distribution server, one or more BSs, and one or more Mobile Stations (MSs). The MBS media server provides MBS data to the BSs and performs authentication and encryption key distribution for the MSs with respect to MBS contents. The MBS distribution server is responsible for scheduling the MBS data to the BSs. Optionally, the MBS distribution server is not provided and instead, an MBS content server may take over the function of MBS data scheduling. The BS transmits the MBS data received over a backbone network to the MSs via radio interfaces. And, the MS receives MBS data from the BS.

In the broadband wireless access system, a MBS may have the following characteristics.

1) Power consumption minimization: an MS can minimize power consumption during receiving MBS data irrespective of its current operation mode (e.g. normal mode, sleep mode, and idle mode).

2) Mobility: an MBS connection may be seamless for a MS even when the MS moves from one BS to another BS.

3) MBS zone: MBS contents are transmitted through a geographically defined MBS zone and MBS configuration information (e.g. MBS connection ID, encryption key, service ID, etc.) may differ in different MBS zones.

4) Security: MBS contents are transmitted only to authenticated users. The encryption key of Medium Access Control (MAC) Packet Data Units (PDUs) of MBS data is commonly applied to the BSs of an MBS zone.

Hereinafter a description will be made of an MBS zone.

Different MBS parameters (e.g. security key, multicast connection ID, etc.) may be set for different zones and broadcasting of MBS contents may be confined to a predetermined zone. Therefore, when an MS moves to another BS or performs handover during receiving MBS contents, the MS should determine whether its stored MBS information is still valid and whether the MS can receive the MBS contents continuously.

If a serving BS transmits an MBS service to the MS according to MBS parameters different from the MBS information preserved in the MS or the serving BS does not transmit MBS contents to the MS, the MS should access a new BS to update its MBS parameters. To avert this problem, the broadband wireless access system defines MBS zones each including a group of one or more MBS BSs.

The BSs within the same MBS zone transmit MBS contents to MSs using the same MBS parameters. Also, an MBS zone ID is transmitted to the MSs so that the MSs can identify the MBS zone. The MSs can immediately check whether their preserved MBS parameters are valid using the MBS zone ID received from the BSs.

When an MS moves to another BS within the same MBS zone, it does not need to re-configure MBS parameters to receive MBS data. As the BSs of the same MBS zone transmit MBS data in the same radio resources at the same time, the resulting macro-diversity effect may increase the MB reception efficiency of the MSs.

An operation for minimizing the power consumption of an MS that is receiving MBS data will be described below.

The MS can reduce power loss during receiving MBS data irrespective of its current operation mode (e.g. normal mode, sleep mode, and idle mode).

Typically, DownLink-MAP Information Elements (DL-MAP IEs) included in a DL-MAP message are defined to indicate bursts transmitted in a current frame. To receive a broadcast burst, the MS should receive and interpret the DL-MAP message in every frame. In this case, power consumption cannot be reduced.

In contrast, an MBS MAP Information Element (MBS_MAP IE) notifies the MS of a frame carrying an MBS data burst, thereby obviating the need for the MS to decode DL frames each having a DL-MAP message but not carrying the MBS data. Consequently, the power consumption of the MS may be minimized. The power saving effect of the MBS_MAP IE is great especially to idle-mode and sleep-mode MSs. Scheduling information about MBS data bursts may be delivered in the MBS MAP IE that is one of DL-MAP IEs, or by a MAC management message such as an MBS MAP message.

A Multi-cell Multicast Broadcast Single Frequency Network (MBSFN) is a service in which a plurality of BSs transmits the same data at the same frequency, forming an MBS zone.

Conventionally, an MBSFN system carries out no uplink feedback and provides services in a fixed Modulation Coding Scheme (MCS). Hence, a BS provides an MBS service with a constant quality to MSs with no regard to channel status and even MSs in good channel status receive excessive-quality services all the time.

In the broadband wireless access system, an MS and a BS establish a connection for a service flow during a service flow creation procedure for data transmission. At this time, the MS and the BS negotiate service quality parameters and negotiate whether Automatic Repeat reQuest (ARQ) will apply to the connection. When a transmission protocol is applied, the MS and the BS exchange transmission parameters with each other.

However, the broadband wireless access system does not allow retransmission for an MBS connection. Therefore, even if the channel environment gets poor and thus the MS fails to receive some MBS data from the BS or received MBS data has errors, there is no way to correct it.

ARQ is defined only for unicast connection between the MS and the BS in the broadband wireless access system. Because a burst profile (Forward Error Correction (FEC) coding type and modulation type) can be configured based on the downlink and uplink signal quality statuses between the BS and the MS, adaptively according to channel status, the reception probability of retransmission may be increased.

However, MBS data is not unicast data transmitted from the BS to the MS. Considering that the MBS data is broadcast to MSs covered by the BS, it is difficult to provide an appropriate burst profile to all MSs that receive the MBS data.

Although the conventional MBSFN system does not perform uplink feedback for MBS and provides services in a fixed MCS, MBS feedback is required to achieve a higher MBS system performance and Adaptive Modulation and Coding (AMC) based on channel status is also needed.

Feedback based on conventional power control and random power ramping technique makes it difficult to accurately measure the reception power level of a detected common Random Access CHannel (RACH) preamble because of the influence of geometry and multi-path. Accordingly, the number of received MBS feedbacks may not be accurately calculated.

Under a wireless mobile communication environment, channels between the MS and the BS may vary in view of various factors including the relative positions of the BS and the MS and geometrical characteristics that the channels experience. Overall system performance as well as the throughput of the particular MS may be increased by appropriately controlling a modulation scheme, a coding scheme, transmit power, etc. according to the channel characteristics between the MS and the BS. In this context, the channel characteristics need to be known and thus the MS is required to measure the channel characteristics and feed back them to the BS.

Nonetheless, there is no MBS uplink feedback and services are provided in a fixed MCS in the conventional MBSFN (Institute of Electrical and Electronics Engineers (IEEE) 802.16e). Meanwhile, the need for an MBS uplink channel is pressing and the PHYsical layer (PHY) structure, feedback type, detection method, etc. of the MBS uplink channel are to be defined in an IEEE 802.16m system.

DISCLOSURE

Technical Problem

An object of the present invention devised to solve the problem lies on a method for increasing MBS transmission performance by designing an MBS uplink feedback channel and applying AMC through Negative ACKnowledgment (NACK) feedback in order to enhance the performance of an MBS system.

Technical Solution

The object of the present invention can be achieved by providing a method for controlling a MBS service, including detecting one or more codes multiplexed in CDM from an MBS feedback channel, and adjusting an MCS based on the detected one or more codes.

The MBS feedback channel may be a contention-based channel.

The one or more codes may be transmitted by MSs that do not satisfy a predetermined PER and NACKs for the MBS service.

The one or more codes may be transmitted every predetermined N superframes.

The one or more codes may be transmitted in different frames for different services.

The MBS feedback channel may include N Contiguous Resource Units (CRUs). Or the MBS feedback channel may include one RU and the RU may include a plurality of tiles. A tile size may be 18×1, 18×2, 18×3, 6×6, 3×6 or 9×6. An orthogonal code may be mapped repeatedly in each tile.

Each of the CRUs may include 18 subcarriers by 6 symbols.

The one or more codes may be orthogonal codes. The orthogonal codes may be Hadamard codes, a Discrete Fourier Transform (DFT) matrices, or Pseudo Random Binary Codes (PRBCs).

The one or more codes may be orthogonal codes, each orthogonal code being mapped on an RU basis. A plurality of MBS services may be shared with an orthogonal code.

The one or more codes may be orthogonal codes, each orthogonal code being mapped on a tile basis and a tile being an element of an RU.

The tile may include 18 subcarriers by 2 symbols, 6 subcarriers by 6 symbols, 18 subcarriers by 1 symbol, or 3 subcarriers by 6 symbols.

One of the N CRUs may be a replica of another CRU. N may be 2 or 4, or a number larger than 4.

The MBS feedback channel may include one Distributed Resource Unit (DRU).

The one or more codes may be Constant Amplitude Zero Auto-Correlation Sequences (CAZAC) sequences, each CAZAC sequence being mapped on a tile basis and a tile being an element of the DRU. One of tiles of the DRU may be a replica of another tile.

The tile may include 18 subcarriers by 2 symbols, 6 subcarriers by 6 symbols, 18 subcarriers by 1 symbol, or 3 subcarriers by 6 symbols.

In another aspect of the present invention, provided herein is a method for transmitting a feedback signal, including receiving an MBS service and transmitting a feedback signal for the MBS service. The feedback signal is transmitted on an MBS feedback channel and includes a code multiplexed in CDM.

The MBS feedback channel may be a contention-based channel.

The transmission may include transmitting the feedback signal, when the MBS service does not satisfy a predetermined PER.

The transmission may occur every predetermined N superframes.

Advantageous Effects

According to the present invention, the performance of an MBS system, especially the transmission performance of digital multimedia/data information can be increased.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

Multi-cell Multicast Broadcast Single Frequency Network (MBSFN) is a service by which a plurality of Base Stations (BSs) transmits the same Multicast and Broadcast Service (MBS) data at the same frequency, forming a zone. There is no specified uplink MBS feedback and an MBS service is provided in a fixed MCS in a conventional MBSFN system (IEEE 802.16e). As a consequence, Mobile Stations (MSs) receive the MBS service with the same quality irrespective of their channel statuses and even MSs in good channel status may receive excessive quality service all the time. In this context, performance improvement may be expected by applying AMC to the MBS system. Hence, an MBS uplink channel is required for uplink MBS feedback. Existing uplink resources defined for unicast transmission may be used or a feedback channel for MBSFN may be allocated, for MBSFN feedback allocation. There are largely three feedback types, higher signaling, Channel Quality Information (CQI) feedback, and NACK feedback. In terms of uplink overhead, the NACK feedback type is preferred. System performance may be improved by use of AMC through NACK feedback that minimizes uplink resource overhead and maximizes feedback detection performance.

Table 1 below lists average coverage and AMC gains over throughput with respect to numbers of MSs per sector, when a fixed MCS is employed.

TABLE 1

|  | MS1 | MS3 | MS5 | MS7 | MS10 | MS15 |
|---|---|---|---|---|---|---|
| Throughput gain | 18.6% | 11.60% | 5% | 4.90% | 6.73% | 4.84% |
| Average coverage | 97.89% | 96.55% | 95.86% | 95.79% | 95.32% | 95.53% |

In the case of AMC for MBSFN under ideal feedback, AMC gains over throughput and average coverage with respect to numbers of MSs per sector are listed in Table 2 below.

TABLE 2

|  | MS1 | MS3 | MS5 | MS7 | MS10 | MS15 |
|---|---|---|---|---|---|---|
| Throughput gain | 31.90% | 24.90% | 20% | 21.48% | 22.80% | 9.00% |
| Average coverage | 96.60% | 95.40% | 95.50% | 95.44% | 95.20% | 95.35% |

As noted from Table 1 and Table 2, the use of AMC outperforms servicing at a fixed MCS level, for MBSFN transmission. Accordingly, there exists a need for designing an MBS uplink feedback channel and defining an MBS uplink feedback and detection scheme in order to implement AMC for MBSFN.

A description will now be made of PHY structures applicable to the MBS uplink according to the present invention.

An MBS uplink channel is not required often. In other words, the MBS uplink channel may not be necessary in every frame. In this context, an MBS uplink feedback channel may be formed every N superframes (N is a natural number) and defined as a contention-based uplink channel in its PHY structure, for the purpose of accurate detection for multiple MSs in a sector in the present invention.

The MBS uplink feedback channel of the present invention may use an orthogonal code or a Constant Amplitude Zero Auto-Correlation (CAZAC) sequence in its PHY structure. In the former case of orthogonal code, Localized Logical Resource Units (LLRUs) may be allocated to the MBS uplink feedback channel. Meanwhile, Distributed Resource Units (DRUs) may be allocated to the MBS uplink feedback channel in the latter case of CAZAC sequence.

An LLRU also called a Contiguous Resource Unit (CRU) includes a group of contiguous subcarriers, for localized resource allocation. A CRU is as large as a Physical Resource Unit (PRU). That is, the CRU has $P_{sc}$ subcarriers by $N_{sym}$ Orthogonal Frequency Division Multiple Access (OFDMA) symbols.

A DRU includes a group of subcarriers spread within a frequency partition by distributed resource allocation. A DRU is as large as a PRU. That is, the DRU includes $P_{sc}$ subcarriers by $N_{sym}$ OFDMA symbols. A minimum unit for forming a DRU is a pair of subcarriers called a tone pair.

A PRU is a basic physical unit of resource allocation, including $P_{sc}$ subcarriers by $N_{sym}$ OFDMA symbols. $P_{sc}$ is 18 and $N_{sym}$ may be 6 for a first-type subframe and 7 for a second-type subframe.

A first-type PHY structure of an MBS uplink feedback channel using LLRUs according to the present invention will be described. In this PHY structure, an orthogonal code may be mapped on an RU or tile basis. Herein, a tile is an element of an RU.

PHY Structure with Orthogonal Code-RU Mapping

Figure 2:
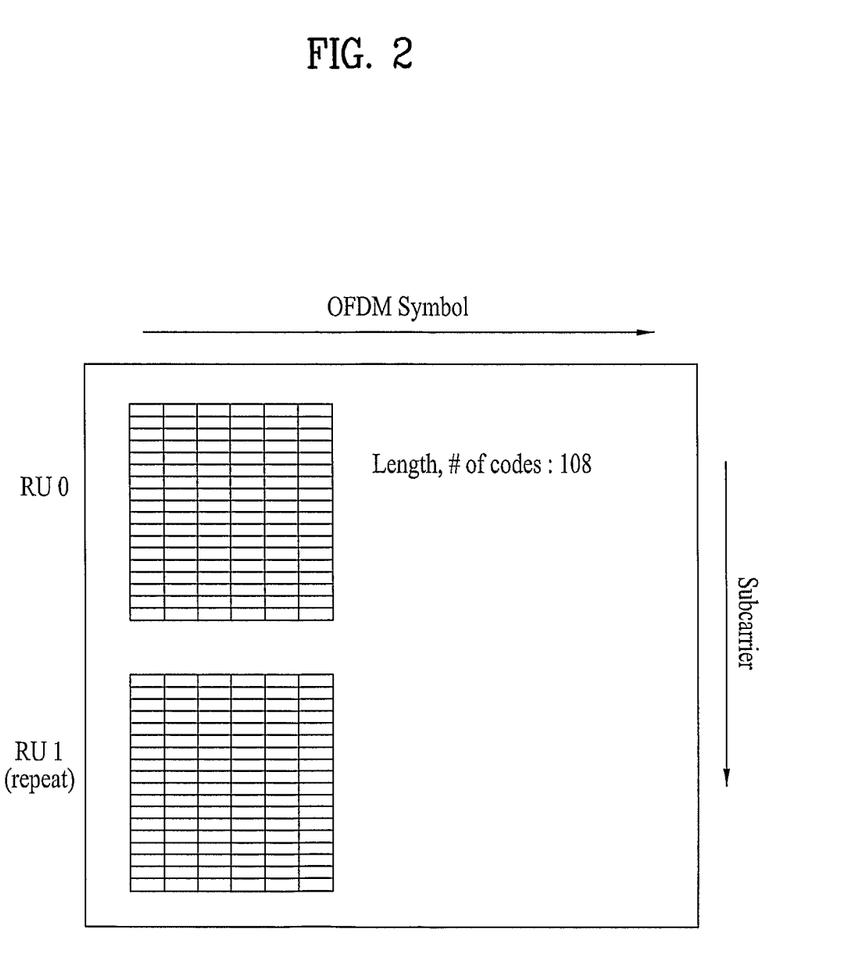
FIG. 2 to FIG. 6 illustrate exemplary PHYsical layer (PHY) structures of an MBS uplink channel according to the present invention.

FIG. 2 illustrates an exemplary PHY structure of an MBS uplink channel according to the present invention.

To accurately detect multiple MSs in a sector, the MBS uplink channel may be defined as a contention-based uplink channel using two RUs in this PHY structure. One RU is preferably defined by 18 subcarriers and 6 symbols, which should not be construed limiting the scope of the present invention.

A NACK feedback from an MS that has not satisfied a 1% Packet Error Rate (PER) may be detected using an orthogonal code from the contention-based uplink channel. The orthogonal code may be generated using a Hadamard code, a Discrete Fourier Transform (DFT) matrix, a Pseudo Random Binary Code (PRBC), or the like. In this case, a group of two Resource Units (RUs) can be mapped in unit of a RU by Localized Logical Resource Unit (LLRU) scheme. When each RU is of a size of 18×6, that is, includes 18 subcarriers by 6 symbols, 108 orthogonal codes of length 108 may be generated and accommodated.

The generated orthogonal code may be transmitted in one of two RUs, RU 0 and repeated in the other RU, RU1, as depicted in FIG. 2. The orthogonal code of length 108 may be LLRU-mapped in RU 0 by a frequency first mapping method or a time first mapping method, and then repeated in RU 1. The 108 orthogonal codes are distributed to a center cell or sector and its neighbor cells or sectors. The orthogonal code distribution may be carried out such that the same orthogonal code is not used in neighboring cells. For example, when 108 orthogonal codes are distributed to a center cell or sector and its six neighbor cells or sectors, only MSs that do not satisfy a 1% PER in each cell may perform NACK feedback using orthogonal codes allocated to the cell to which they belong, among the MSs of the cell.

PHY Structure 1 with Orthogonal Code-Tile Mapping

Figure 3:
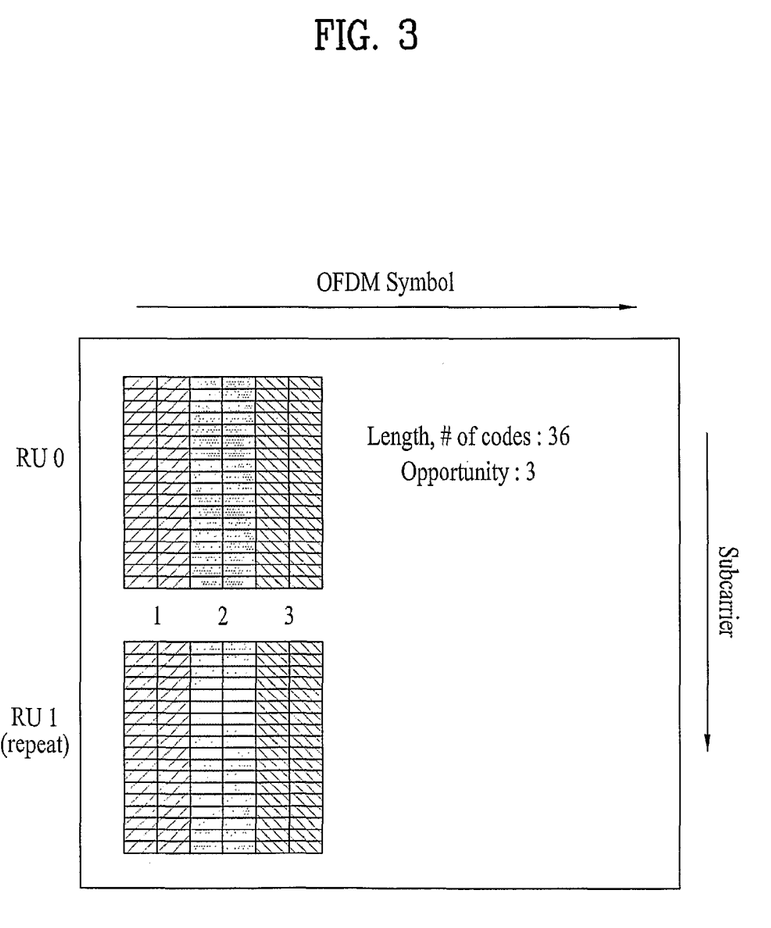

FIG. 3 illustrates an exemplary PHY structure of an MBS uplink channel according to the present invention.

The afore-described 18×6 RU may be divided into three 18×2 tiles as illustrated in FIG. 3. Then the generated orthogonal code may be LLRU-mapped on a tile basis. Each tile represents an opportunity. Hence, three opportunities may exist in one RU. Since each tile includes 36 (18×2) resource elements, 36 orthogonal codes may be mapped to the tile.

In this case where one RU, RU 0 is divided into a plurality of tiles, the same orthogonal code may be repeated along the frequency axis in another RU, RU1 so as to get frequency diversity. That is, an MS may transmit an orthogonal code allocated to a cell or sector to which the MS belongs in one of three time-domain opportunities, that is, in one of the three tiles of one RU. In this case, the orthogonal code may be one of 36 orthogonal codes. Compared to the illustrated case of FIG. 2 in which 108 orthogonal codes are used in one RU, this PHY structure is relatively speed-tolerant. Due to three opportunities each accommodating 36 orthogonal codes, 108 (36×3) orthogonal codes may be identified.

PHY Structure 2 with Orthogonal Code-Tile Mapping

Figure 4:
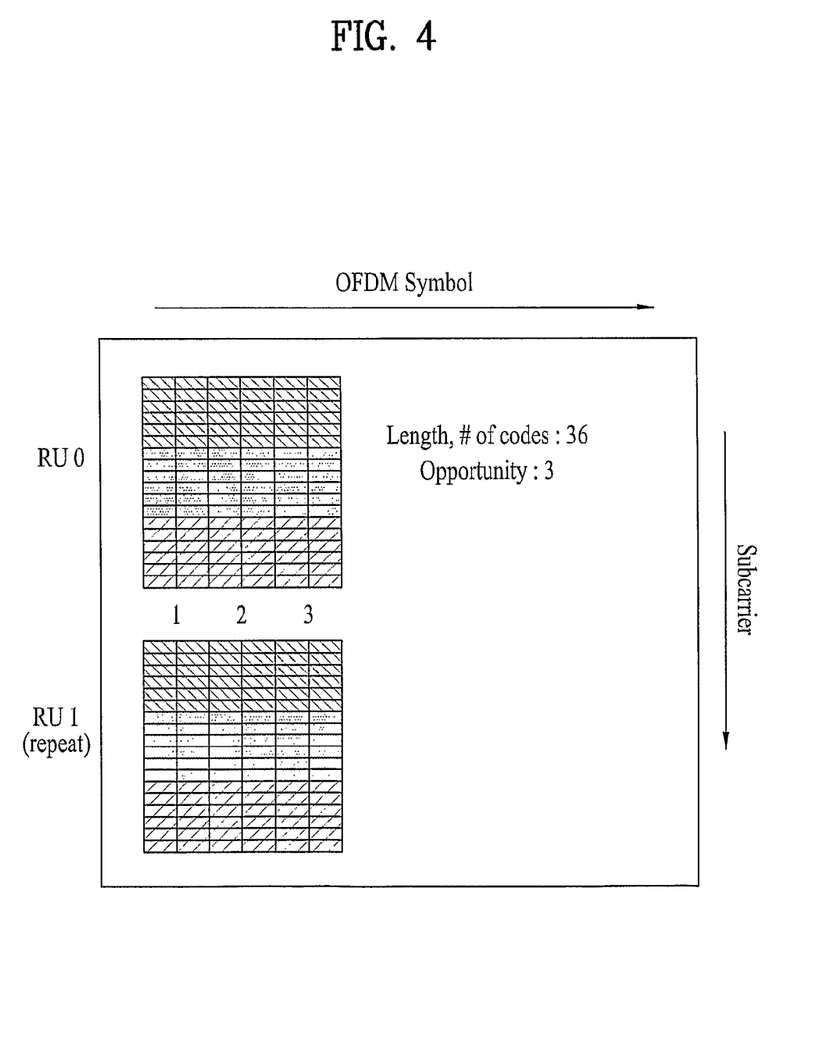

FIG. 4 illustrates an exemplary PHY structure of the MBS uplink channel according to the present invention.

The afore-described 18×6 RU may be divided into three 6×6 tiles, as illustrated in FIG. 4. The generated orthogonal code may be LLRU-mapped on a tile basis. Each tile represents an opportunity. Hence, three opportunities may exist in one RU. Since each tile has 36 (6×6) resource elements, 36 orthogonal codes may be mapped to each tile. The PHY structure illustrated in FIG. 4 in which one RU is divided along the frequency axis may be effective in an environment experiencing severe frequency selectivity.

PHY Structure 3 with Orthogonal Code-Tile Mapping

While not shown, the afore-described 18×6 RU may be divided into six 18×1 or 3×6 tiles, for LLRU mapping. Then the 18×6 RU may be represented by 18 orthogonal codes and six opportunities. Similarly, if the afore-described 18×6 RU may be divided into two 18×3 or 9×6 tiles for LLRU mapping, the 18×6 RU may be represented by 54 orthogonal codes and two opportunities.

PHY Structure 4 with Orthogonal Code-Tile Mapping

The above-described feedback channel delivers an orthogonal code repeatedly along the frequency axis using two RUs. If there are a small number of MSs in each cell or sector, only one RU may be allocated to the feedback channel.

In this PHY structure, one RU may be divided into a plurality of tiles (each of size 18×1, 18×2, 18×3, 6×6, 3×6, or 9×6) and an orthogonal code may occur in each tile repeatedly by LLRU-mapping.

For example, for a tile size of 18×2, one RU has three tiles. An MS may transmit an orthogonal code allocated to its cell or sector repeatedly in the three tiles. This PHY structure may save uplink resources when a small number of MSs exist, in spite of a decrease in the number of available orthogonal codes.

Now a description will be made of a second-type PHY structure of the MBS uplink feedback channel using DRUs according to the present invention.

In accordance with the present invention, NACK feedback may be carried out by use of a DRU and a CAZAC sequence. Although the CAZAC sequence does not guarantee perfect orthogonality, it enables relatively accurate NACK feedback with a small amount of resources. For example, while the MBS uplink channel using orthogonal codes occupies two RUs, a single RU suffices for CAZAC sequence-based resource allocation.

Figure 5:
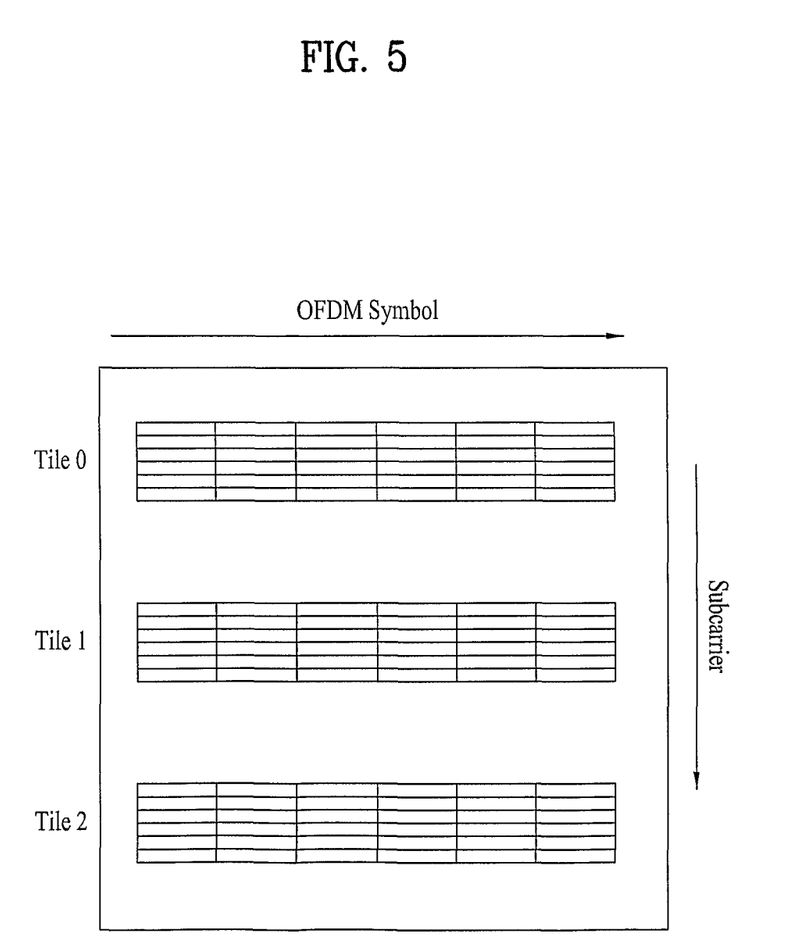
Figure 6:
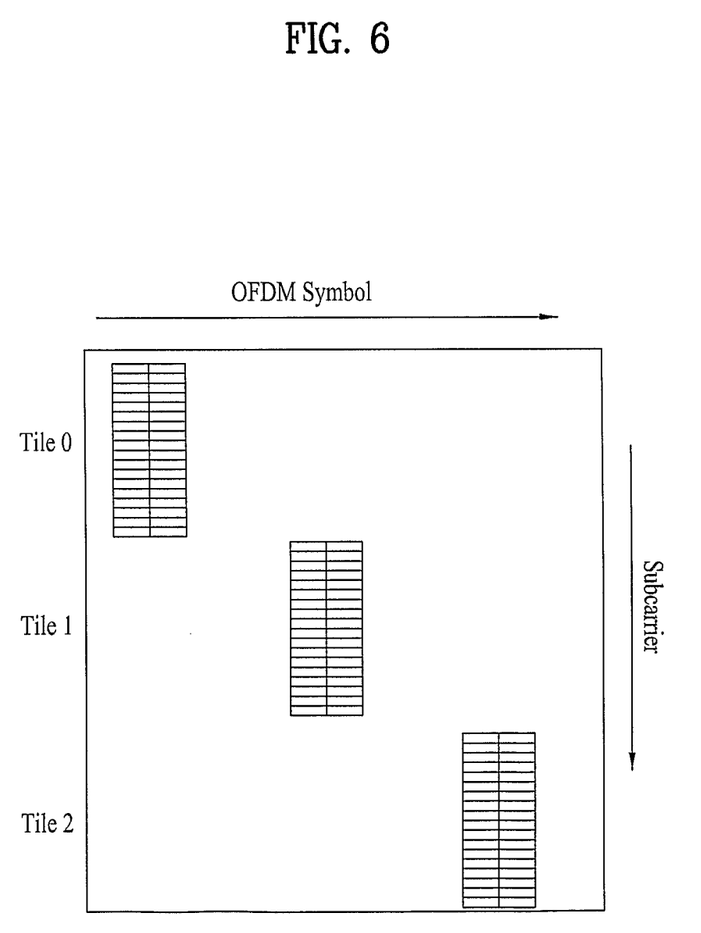

FIG. 5 and FIG. 6 illustrate exemplary PHY structures of the MBS uplink channel according to the present invention.

Referring to FIG. 5, for example, in an 18×6 RU, a CAZAC sequence is repeated on a 6×6 DRU basis by DRU-mapping. As many CAZAC sequences as can be generated for a 6×6 tile may be allocated to one cell or sector. Sequences created by cyclically shifting the CAZAC sequence may be used in other cells or sectors around the one cell or sector. Although the cyclically shifted CAZAC sequences does not guarantee perfect orthogonality, the PHY structure illustrated in FIG. 5 enables efficient and relatively accurate NACK feedback with less uplink resources. For the convenience' sake of description, it is assumed that orthogonal codes are used for NACK feedback. However, CAZAC sequences may substitute for the orthogonal codes, as stated before. The same CAZAC sequence may be mapped to tile 0, tile 1 and tile 2 in FIG. 5.

The DRU mapping on a tile basis illustrated in FIG. 5 may produce diversity. Therefore, there is no need for repeated mapping in two RUs as illustrated in FIGS. 2, 3 and 4.

Similarly, DRU mapping may be carried out by repetition on an 18×2-tile basis, as illustrated in FIG. 6. The DRU mapping of FIG. 6 may lead to both time and frequency diversities.

The methods illustrated in FIG. 3 and FIG. 4 require that 36 orthogonal codes that can be allocated to each cell are allocated separately to a plurality of neighboring cells in a multi-cell environment. On the other hand, for the methods illustrated in FIG. 5 and FIG. 6, 36 CAZAC sequences need not be distributed to neighboring cells because the same CAZAC sequence is cyclically shifted by a different value in each cell in the multi-cell environment.

Aside from transmission of repeated sequences in three tiles, transmission of different sequences in the three tiles may maximize the number of available sequences in DRU mapping. This DRU mapping method may support a large number of MSs using the maximized number of sequences for a small amount of resources, but is not favorable for MSs experiencing defading.

A feedback and detection method for E-MBS according to an exemplary embodiment of the present invention will be described below.

MBS feedback need not occur frequently. MBS uplink feedback-based AMC applies on a long-term basis. Therefore, an MBS uplink feedback channel may be generated every N superframes (N is a natural number).

Figure 7:
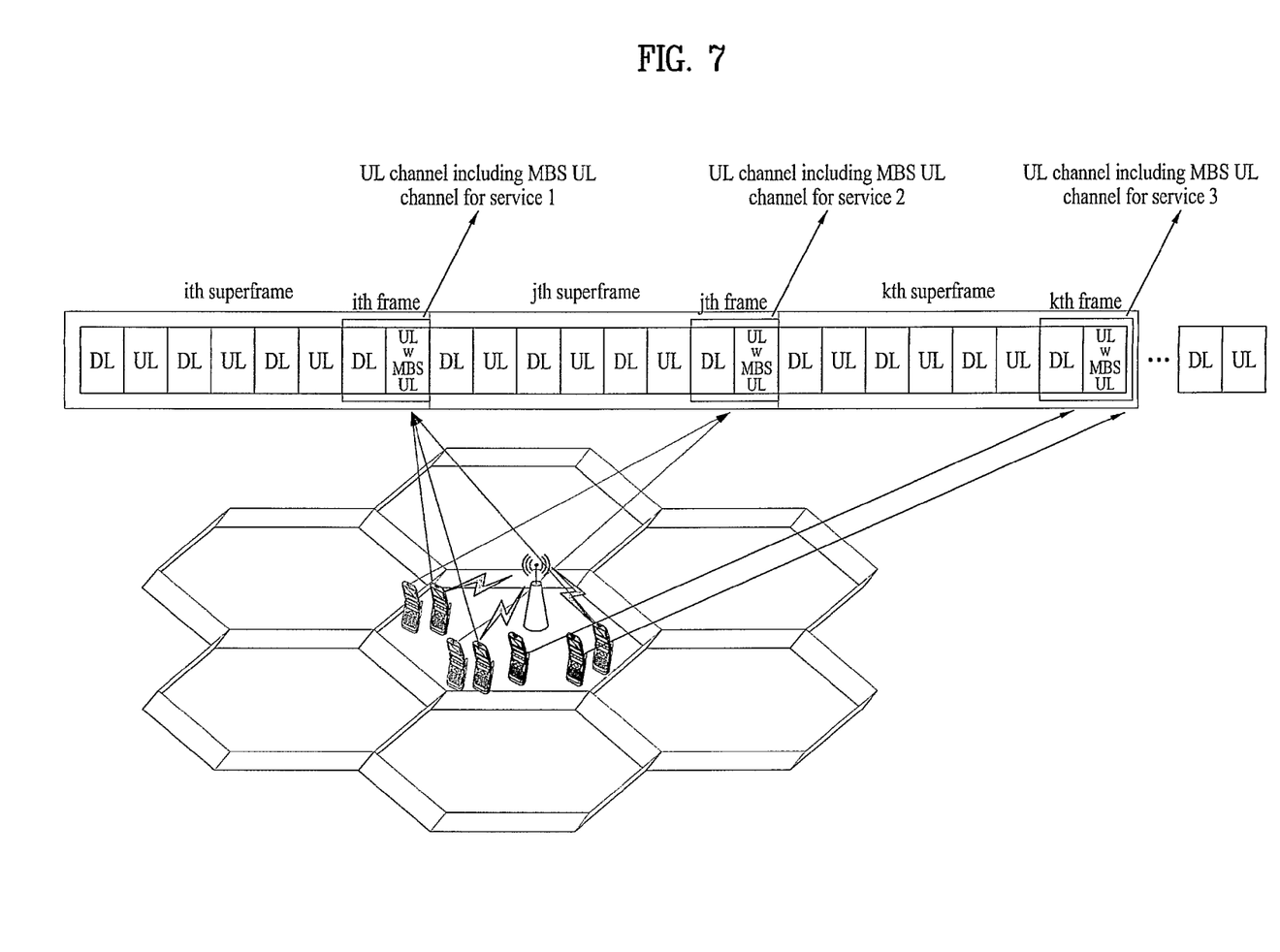
FIG. 7 illustrates an exemplary method for feeding back a NACK in an MS in a cell that provides different MBS services.

FIG. 7 illustrates an exemplary method for feeding back a NACK in an MS in a cell that provides different MBS services.

MSs that are receiving the same service (e.g. MS 1 and MS 2) may feed back NACKs in Code Division Multiplexing (CDM) using orthogonal codes allocated to their cells or sectors, so that the NACK feedbacks are distinguished from each other. Each MS may transmit a NACK on an MBS uplink channel that occurs every predetermined time period (e.g. every N superframes) using an orthogonal code allocated to a cell or sector to which it belongs. Referring to FIG. 7, for example, MS 1 may transmit a NACK using a first orthogonal code and MS 2 may transmit a NACK using a second orthogonal code. The MBS uplink channel may be configured in one of the above-described PHY structures according to the present invention. MSs have already acquired information about the positions of MBS uplink feedback channels from a BS. NACK feedbacks to each BS are collected and AMC is performed by adjusting an MCS level based on the NACK feedbacks. If the BS fails to receive a NACK feedback code from an MS, the MS may re-try a NACK feedback using the same code a predetermined number of frames later.

NACK feedbacks for different MBS services 601, 602 and 603 may be processed in Time Division Multiplexing (TOM). That is, for different MBS services (e.g. MBS service 1, MBS service 2, . . . ), MSs may feed back NACKs using orthogonal codes allocated to their cells or sectors on an MBS uplink channel at predetermined different timings (at intervals of one or more superframes).

In other words, MSs may feed back NACKs in CDM using orthogonal codes allocated to their cells or sectors every N superframes, for the same service, whereas the MSs may feed back NACKs in TDM using the orthogonal codes at different intervals, for different services.

MBSFN is a system with 95% coverage, satisfying a PER of 1%. Hence, the ratio of the number of MSs that do not satisfy the 1% PER and thus feed back NACKs to the total number of MSs is not high. If the ratio exceeds a predetermined ratio (e.g. 30%), the MSs are serviced at a robust MCS level. Therefore, there is no need for using as many orthogonal codes as the total number of MSs. Rather, NACK feedbacks from MSs may be detected with fewer codes. For instance, when 108 orthogonal codes are used as in the above-described example, they are distributed to 7 cells or sectors so that each cell or sector may 15 or more orthogonal codes on the average. 15 or more orthogonal codes are enough for feedback from a sufficient number of MSs in each cell or sector.

If MSs increase in number in each cell or sector, their NACK feedbacks may be detected in the following methods. First, a 2-RU MBS uplink channel may be extended to 4 RUs such that a larger number of MSs may efficiently use resources in an MBS service. Another method is to share orthogonal codes allocated to one service among one or more (two or three) MBS services in each cell or sector. This method is useful when more services are provided in an MBSFN zone. If more services are provided for a given number of MSs, the number of MSs per service is decreased and NACK feedbacks from the MSs may be detected with fewer orthogonal codes.

NACK feedback information in each cell or sector is collected through each BS and an MCS level is adjusted based on the NACK feedback information. Since the channel status of each cell or sector is known from the NACK feedback information, Hierarchical Modulation (HM) is possible for cells or sectors in good channel status, after MCS level adjustment for a whole MBSFN zone. Therefore, the overall MBSFN performance may be improved. In HM, two separate data streams are modulated onto a single stream. One stream, called a "High Priority" (HP) stream is embedded within a "Low Priority" (LP) stream. MSs in good channel status can receive both streams, while those in poor channel status may only receive the "High Priority" stream. Take 16-ary Quadrature Amplitude Modulation (16QAM) for example. Two HP bits (odd-numbered bits of 4 bits) and two LP bits (even-numbered bits of the 4 bits) are combined and the resulting 4 bits are mapped to a uniform or non-uniform 16QAM constellation. The HP bits determine a quadrant and the LP bits determine a point in the selected quadrant. For HM, 64-ary QAM (64QAM) as well as Quadrature Phase Shift Keying (QPSK) and 16QAM may be used. Unless each BS services at the same MCS level in an MBSFN zone, Radio Frequency (RF) combining is not viable. Owing to HM, MSs in a good-status cell may receive an MBS service at a high MCS level, whereas a poor-status cell experiences relatively great interference. As a result, a trade-off may occur.

Figure 8:
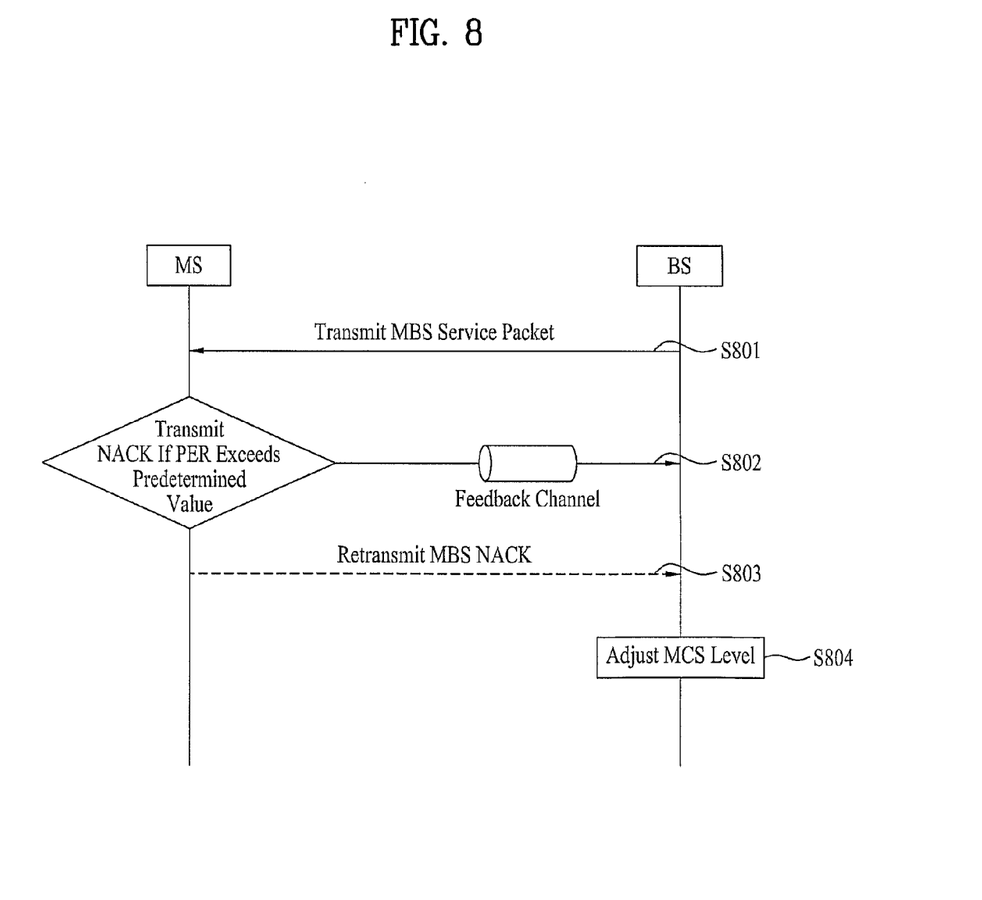
FIG. 8 is a flowchart illustrating an MBS service controlling method according to an exemplary embodiment of the present invention.

FIG. 8 is a flowchart illustrating an MBS service controlling method according to an exemplary embodiment of the present invention.

Referring to FIG. 8, when a BS transmits an MBS service packet in step S801, an MS measures a PER. If the PER measurement exceeds a predetermined value, the MS may transmit a NACK in step S802. The NACK may be delivered on an MBS feedback channel. The feedback channel may be configured in one of the afore-described PHY structures of the present invention. The BS may receive NACKs from one or more MSs on the feedback channel. If receiving NACKs from more MSs than a predetermined number, the BS may increase an MCS level in step S804. On the other hand, if receiving NACKs from fewer MSs than the predetermined number, the BS may decrease the MCS level in step S804. If receiving NACKs from MSs in number between a predetermined first number and a predetermined second number, the BS may maintain the MCS level unchanged in step S804. Meanwhile, if the PER of an MS larger than the predetermined value does not drop below the predetermined value in spite of a NACK transmission from the MS, the MS may re-transmit the NACK in step S803. The exemplary embodiment of the present invention illustrated in FIG. 8 is a mere example of combining the technical features of the present invention, to which the scope of the present invention is not limited.

The above-described exemplary embodiments are disclosed in specific combinations of components and features of the present invention. Unless otherwise indicated, each component or feature should be regarded selective. Each component or feature may be implemented separately without combining with other components or features. Conversely, exemplary embodiments of the present invention may be realized by combining some components and/or features. The order of operations described in the exemplary embodiments of the present invention may be changed. Some configuration or features of an exemplary embodiment may be incorporated into another exemplary embodiment, or replaced with corresponding configuration or features of another exemplary embodiment. It is obvious to those skilled in the art that claims that are not explicitly cited in each other in the appended claims may be presented in combination as an exemplary embodiment of the present invention or included as a new claim by a subsequent amendment after the application is filed.

In the exemplary embodiments of the present invention, a description is made of a data transmission and reception relationship between a BS and an MS Herein, the term 'BS' refers to a terminal node of a network, which communicates directly with the MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', etc. The term 'MS' may be replaced with the term 'User Equipment (UE)', 'Mobile Subscriber Station' (MSS), etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

MODE FOR INVENTION

Various embodiments have been described in the best mode for carrying out the invention.

INDUSTRIAL APPLICABILITY

The present invention is applicable to devices used in an MBSFN system.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

The invention claimed is:

1. A method for controlling a multicast and broadcast service (MBS) in a wireless access system, the method performed by a mobile station (MS) and comprising:
receiving a first MBS data modulated by a first modulation and coding scheme (MCS) level;
transmitting a feedback data through a feedback channel assigned to a contiguous resource unit (CRU), including adjacent subcarriers in consecutive symbols, when the first MBS data does not satisfy a predetermined packet error rate; and
receiving a second MBS data modulated by a second MCS level determined based on the feedback data,
wherein the MS transmits the feedback data using at least one of orthogonal codes mapped on the CRU,
wherein the second MBS data transmitted through a low priority MBS data steam and a high priority MBS data stream embedded within the low priority MBS data stream, and
wherein the MS having a channel status value greater than a reference channel status value receives both the low priority MBS data steam and the high priority MBS data stream, and the MS having a channel status value less than or equal to the reference channel status value receives only the high priority MBS data stream.

2. The method according to claim 1, wherein the orthogonal codes are orthogonal to each other in the CRU.

3. The method according to claim 1, wherein the CRU is divided into tiles along a time axis or a frequency axis, and same orthogonal codes repeatedly mapped to each of the tiles.

4. The method according to claim 3, wherein the feedback data is transmitted through one of the tiles which is determined based on a channel condition of the MS.

5. The method according to claim 1, wherein the feedback channel is further assigned to a replicated CRU, and same feedback data is repeatedly transmitted through the CRU and the replicated CRU.

6. The method according to claim 1, wherein the CRU includes 18 adjacent subcarriers in 6 consecutive symbols.

7. The method according to claim 1, further comprising receiving at least one of a third MBS data and a fourth MBS data based on a channel condition of the MS,
wherein the third MBS data and the fourth MBS data are modulated by different MCS level to each other but include same information.

8. The method according to claim 1, wherein the feedback data includes a Negative ACKnowledgment (NACK) for the MBS.

9. The method according to claim 1, wherein the second MCS level is related to a 16-ary Quadrature Amplitude Modulation (16QAM), and
wherein two odd-numbered bits of 4 bits and two even-numbered bits of the 4 bits are combined, and the 4 bits are mapped to a 16QAM constellation.

10. A method for controlling a multicast and broadcast service (MBS) in a wireless access system, the method performed by a base station and comprising:
transmitting a first MBS data modulated by a first modulation and coding scheme (MCS) level;
receiving a feedback data through a feedback channel assigned to a contiguous resource unit (CRU), including adjacent subcarriers in consecutive symbols, when the first MBS data transmitted to a mobile station (MS) does not satisfy a predetermined packet error rate; and
transmitting a second MBS data modulated by a second MCS level determined based on the feedback data,
wherein the feedback data is transmitted by using at least one of orthogonal codes mapped on the CRU, and
wherein the second MBS data transmitted through a low priority MBS data steam and a high priority MBS data stream embedded within the low priority MBS data stream, and
wherein the MS having a channel status value greater than a reference channel status value receives both the low priority MBS data steam and the high priority MBS data stream, and the MS having a channel status value less than or equal to the reference channel status value receives only the high priority MBS data stream.

11. The method according to claim 10, wherein the orthogonal codes are orthogonal to each other in the CRU.

12. The method according to claim 10, wherein the CRU is divided into tiles along a time axis or a frequency axis, and same orthogonal codes repeatedly mapped to each of the tiles.

13. The method according to claim 12, wherein the feedback data is transmitted through one of the tiles which is determined based on a channel condition of the MS.

14. The method according to claim 10, wherein the feedback channel is further assigned to a replicated CRU, and same feedback data is repeatedly transmitted through the CRU and the replicated CRU.

15. The method according to claim 10, wherein the CRU includes 18 adjacent subcarriers in 6 consecutive symbols.

16. The method according to claim 10, further comprising transmitting a third MBS data and a fourth MBS data,
   wherein the third MBS data and the fourth MBS data are modulated by different MCS level to each other but include same information.

17. The method according to claim 10, wherein the feedback data includes a Negative ACKnowledgment (NACK) for the MBS.

18. The method according to claim 10, wherein the second MCS level is related to a 16-ary Quadrature Amplitude Modulation (16QAM), and
   wherein two odd-numbered bits of 4 bits and two even-numbered bits of the 4 bits are combined, and the 4 bits are mapped to a 16QAM constellation.

\* \* \* \* \*